(12) United States Patent
Beale et al.

(10) Patent No.: US 8,201,841 B2
(45) Date of Patent: Jun. 19, 2012

(54) BICYCLE REAR SUSPENSION LINKAGE

(75) Inventors: Luther M. Beale, Portland, OR (US); David M. Earle, Watsonville, CA (US)

(73) Assignee: Sotto Group, LLC, Watsonville, CA (US)

( * ) Notice: Subject to any disclaimer, the term of this patent is extended or adjusted under 35 U.S.C. 154(b) by 0 days.

(21) Appl. No.: 13/227,226

(22) Filed: Sep. 7, 2011

(65) Prior Publication Data

US 2012/0056401 A1 Mar. 8, 2012

Related U.S. Application Data

(63) Continuation of application No. 12/506,508, filed on Jul. 21, 2009, now Pat. No. 8,066,297.

(51) Int. Cl.
*B62K 3/02* (2006.01)

(52) U.S. Cl. ......... 280/284; 280/288; 280/285; 280/286

(58) Field of Classification Search .................. 280/284, 280/288, 285, 286
See application file for complete search history.

(56) References Cited

U.S. PATENT DOCUMENTS

| | | | |
|---|---|---|---|
| 5,553,881 A | 9/1996 | Klassen et al. | |
| 5,628,524 A | 5/1997 | Klassen et al. | |
| 5,791,674 A | 8/1998 | D'Aluisio et al. | |
| 5,899,480 A | 5/1999 | Leitner | |
| 6,076,845 A | 6/2000 | Lawwill et al. | |
| 6,099,010 A | 8/2000 | Busby | |
| 6,206,397 B1 | 3/2001 | Klassen et al. | |
| 6,488,301 B2 | 12/2002 | Klassen et al. | |
| 6,969,081 B2 | 11/2005 | Whyte | |
| 7,048,292 B2 | 5/2006 | Weagle | |
| RE39,159 E | 7/2006 | Klassen et al. | |
| 7,128,329 B2 | 10/2006 | Weagle | |
| 7,392,999 B2 | 7/2008 | O'Connor | |
| 7,815,207 B2 | 10/2010 | Currie | |
| 2005/0057018 A1 | 3/2005 | Saiki | |
| 2005/0285367 A1 | 12/2005 | Chang et al. | |
| 2006/0022429 A1 | 2/2006 | Ellsworth et al. | |
| 2006/0071442 A1 | 4/2006 | Hoogendoorn | |
| 2006/0119070 A1 | 6/2006 | Weagle | |
| 2006/0181053 A1 | 8/2006 | Huang et al. | |
| 2007/0108725 A1 | 5/2007 | Graney | |
| 2007/0210555 A1 | 9/2007 | O'Connor | |

(Continued)

OTHER PUBLICATIONS

Nov. 12, 2009, Office Action from US Patent and Trademark Office, in U.S. Appl. No. 12/426,042, which is another application of applicant Luther M. Beale, 12 pages.

(Continued)

*Primary Examiner* — Lesley D Morris
*Assistant Examiner* — Marlon Arce
(74) *Attorney, Agent, or Firm* — Kolisch Hartwell P.C.

(57) ABSTRACT

A bicycle comprising a front triangle and a rear wheel having a rear wheel axis, a rear wheel suspension system further comprising a link further comprising a first pivotal axis for connection to said front triangle and a second pivotal axis for connection to a rear wheel swingarm, wherein the distance from said second pivotal axis to a first vertical plane decreases during a first portion of suspension compression and increases during a second portion of suspension compression; and wherein said first vertical plane is defined as a plane which is perpendicular to the ground and offset in the direction of the rear wheel with respect to the first and second pivotal axis. During the first portion of suspension compression and during the second portion of suspension compression the front triangle remains stationary with respect to the first vertical plane.

19 Claims, 14 Drawing Sheets

U.S. PATENT DOCUMENTS

| | | |
|---|---|---|
| 2007/0246909 A1 | 10/2007 | Weng |
| 2008/0054595 A1 | 3/2008 | Lu |
| 2008/0258427 A1 | 10/2008 | Buckley |
| 2008/0303242 A1 | 12/2008 | O'Connor |
| 2009/0001686 A1 | 1/2009 | Currie |
| 2009/0026728 A1 | 1/2009 | Domahidy |
| 2009/0261556 A1 | 10/2009 | Beale et al. |
| 2009/0261557 A1 | 10/2009 | Beale et al. |
| 2009/0278331 A1 | 11/2009 | Graney |
| 2011/0018228 A1 | 1/2011 | Beale et al. |

OTHER PUBLICATIONS

May 27, 2010, Office Action from US Patent and Trademark Office, in U.S. Appl. No. 12/426,042, which is another application of applicant Luther M. Beale, 8 pages.

Jun. 8, 2010, International Search Report from US Receiving Office, in PCT/US2010/031640, which is the international application for this US application, 2 pages.

Jun. 8, 2010, Written Opinion of the International Searching Authority from US Receiving Office, in PCT/US2010/031640, which is the international application from this US application, 12 pages.

Oct. 1, 2010, Office Action from the US Patent and Trademark Office, in U.S. Appl. No. 12/426,042, which is another application of applicant Luther M. Beale, 10 pages.

Nov. 4, 2010, Office Action from the US Patent and Trademark Office, in U.S. Appl. No. 12/506,508, which is the continuation application for this US application, 11 pages.

Jun. 23, 2011, Office Action from the US Patent and Trademark Office, in U.S. Appl. No. 12/426,042, which is another application of applicant Luther Beale, 12 pages.

Jul. 27, 2011, Office Action from the US Patent and Trademark Office, in U.S. Appl. No. 12/506,508, which is the continuation application for this US application, 9 pages.

Oct. 27, 2011, International Preliminary Report on Patentability from US Receiving Office, in PCT/US2010/031640, which is the international application from this US application, 12 pages.

Dec. 12, 2011, Office Action from the US Patent and Trademark Office, in U.S. Appl. No. 12/426,037, which is another application of applicant Luther M. Beale, 19 pages.

Rockrider bicycle by Decathlon from Villeneuvue d'Ascq, France, images captured at http://www.ab-bike.com/b-twin-decathlon__377/full-suspension-mountainbike__rockrider-er2-m-xl__1390.html on Dec. 29, 2011, 8 pages.

BICYCLE REAR SUSPENSION LINKAGE

CROSS-REFERENCE TO RELATED APPLICATIONS

This application is a continuation of Ser. No. 12/506,508 filed Jul. 21, 2009, which is related to U.S. provisional patent application Ser. No. 61/124,789 filed Apr. 17, 2008, both of which are hereby incorporated by reference.

This application also relates to two U.S. nonprovisional patent applications: Ser. No. 12/426,042 and Ser. No. 12/426,037, both filed on Apr. 17, 2009, and both of which are hereby incorporated by reference.

BACKGROUND

1. Field of the Invention

The present invention relates to a new bicycle rear suspension system, and in particular to a four-bar suspension system that offers improved pedaling and bump absorption performance by means of controlling the rate of chainstay lengthening through the use of a small eccentric mechanism located in close proximity to the bicycle chain line.

2. Background of the Invention

There are numerous bicycle suspension systems in use today to improve bicycle performance. A suspension system allows the rear wheel of the bike to better track the terrain resulting in improved traction while pedaling, turning, and braking. Additionally, the absorption of bump forces by the suspension system increases rider comfort. These systems range from the simple to the complex.

3. Description of Related Art

One of the simplest bicycle suspensions is the single pivot system in which a rear triangle swingarm is attached to a main front triangle at a single pivot point. With this type of suspension, the rear wheel of the bike may track the terrain but must do so while moving in a simple circular arc about the pivotal connection.

While the single pivot systems are very simple, relatively easy to design, and adequately handle small bumps, they fail to address many performance issues. Both their pedaling performance and their bump absorption capabilities are controlled by the location of the single pivotal connection between the front triangle and the rear triangle swingarm. In this type of suspension, the rear axle of the bike rotates about a single axis, and as a consequence the bike's rear suspension is either compressed or extended by the forces imparted to the pedals by the bike rider, dependent upon the specific configuration of the bike suspension. Likewise, compression and extension of the suspension can impart torque on the pedals and supply unwanted force to the rider's legs. Thus, some of the energy expended by the rider of the bike is used needlessly wasted, either compressing or extending the suspension of the system, or resisting unwanted pedal rotation imparted by the suspension.

One solution to the above problem is through the use of adjustments to the length of the chainstay during the course of compression of the bike's suspension. The chainstay length of a bicycle is the distance from the rear wheel axle to the center of the bottom bracket shell. The chainstay length of a bicycle with real wheel suspension may be variable, the length being dictated by the location of the pivotal connection between the front triangle and the rear triangle swingarm and the motion of the rear triangle swingarm. In single pivot systems there is no means for varying the rate of chainstay lengthening through the travel of the suspension. Thus, if the rate of chainstay lengthening is high, so as to decrease unwanted pedal rotation and increase the anti-squat characteristics of the suspension system, the result will be excessive chainstay lengthening at full compression and the application of excessive torque to the pedal crankarms.

In single pivot systems, the shock rate is only controlled by the single pivot point between the front triangle and the rear triangle swingarm. As a result, ineffective compromises in the suspension system's performance must always be struck. These compromises include excessive chainstay lengthening resulting in unwanted torque applied to the bicycle's pedal crankarms, extension or compression of the suspension system due to pedal forces, and extension or compression of the suspension system during acceleration and braking due to weight transfer. Additionally, as may be apparent from the above, any system that articulates the rear wheel along an arc forfeits the performance benefits associated with articulating the rear wheel along a controlled, and preferential travel path. A controlled travel path allows for, among other benefits, chainstay lengthening to occur at varying rates through the compression of the suspension.

A more complex form of bicycle suspension is a linkage system. Such systems attach the rear wheel swingarm to the main front triangle through a plurality of links to improve the performance of the suspension system by manipulating both shock rate and wheel travel path, and thus chain stay lengthening. These systems provide challenges to the suspension designer, in that there is typically a tradeoff between optimally manipulating the rear wheel travel path and controlling the change in the shock rate. In order to make some linkage suspension systems perform well, the variation in the rear wheel travel path has typically been small throughout the range of travel. Systems that vary the rear wheel travel path to a greater extent generally must also vary the shock rate to a great extent, which leads to undesirable bump absorption characteristics.

Various forms of linkage systems have been developed in an attempt to resolve the above limitations. Some linkage systems use a single pivot swingarm and a linkage to activate the shock absorber, such as the Turner 5-Spot by Turner Suspension Bicycles, Inc. in Murrieta, Calif. These systems allow for more complicated leverage ratios than a single pivot system, which results in increased tunability of the shock absorber leverage rate. However, even with this improved system, the rear wheel still moves in an arc, resulting in many of the same compromises in performance from which the single pivot suspension systems suffer.

While there is a great variety in these linkage systems, most are four-bar systems that articulate the rear wheel in a more complicated manner than is allowed with a single pivot system. Stated generally, there are two classes of four-bar linkage systems. The first class comprises systems that use a long first linkage member that places a pivot point near the rear axle. The long link systems generally have separate chainstay and seat stay assemblies that are bolted together at a pivot. An example of a long link four-bar linkage system is the Stumpjumper by Specialized Bicycle Components out of Morgan Hill, Calif., and disclosed in U.S. Pat. No. 5,899,480 to Leitner. Because this class of four bar linkage systems articulates the rear wheel in a large radius arc, the employment of an optimal amount of chainstay lengthening in the early part of the rear wheel's travel results in an unacceptable total amount of chainstay lengthening when the system is fully compressed. In order to cope with this deficiency, this style of suspension system typically employs the minimal amount of chainstay lengthening that is acceptable, so as to consequently minimize the total amount of lengthening when the system is fully compressed. Firmer shock absorber spring and damping rates are required to allow for acceptable pedaling performance.

The second class of four-bar linkage systems uses a short first linkage member where the connection between the seat stays and the chainstays is generally rigid, thereby resulting in a rear triangle wherein a swingarm is connected to two short links. Due to the short linkage members rotating with greater angular velocity when compared to the first type of four bar linkage system there is greater ability to tune the axle path of this suspension system.

The short link designs making up the second class of four-bar linkage systems can be further separated into two sub-classes. The first sub-class is one in which the two links rotate in the same direction as the suspension is compressed. U.S. Pat. No. 7,128,329 to Weagle discloses a rear wheel suspension system that falls into this first class of short link four bar linkage systems. This design utilizes anti-squat behavior to mitigate the unwanted effects of the suspension system compressing and extending due to forward acceleration when pedaling. This design suffers from the drawback that chainstay lengthening effects are minimally utilized and instead the suspension system is designed to provide an optimized anti-squat behavior for an arbitrary constant pedaling input force and gear. In practice, both the pedaling input force and gear are greatly variable and thus an assumption that they are an arbitrary constant is invalid and suboptimal.

The Rockrider by Decathlon out of Villeneuve d'Ascq, France is an example of a bicycle of the first sub-class that uses an eccentric as a link in a short link four bar linkage system. The eccentric rotates only in one direction as the suspension compresses. The distance between the pivots on the small link is significantly larger than 15 mm, and thus suffers from a weight disadvantage. This design moves the rear wheel in a very large arc, and as such suffers from the typical performance drawbacks experienced by other similar systems, such as the inability to control the chainstay lengthening effect and provide for an optimized rear wheel travel path that reduces pedaling induced compression and extension of the suspension.

In the second sub-class of short link four-bar systems the links rotate in opposite directions as the system is compressed. That is, one link rotates in a first direction and a second link rotates in a second direction. An example of the second type of short link system is the Blur by Santa Cruz Bicycles out of Santa Cruz, Calif. and disclosed in U.S. Pat. No. 6,206,397 to Klassen and Calon. These systems employ an S-shaped wheel travel path to selectively apply chainstay lengthening. The net result, however, is that as the suspension moves from its statically loaded sag point (to either a direction of further compression or a direction of reduced compression), chainstay lengthening occurs. Because chainstay lengthening occurs during extension from the suspension's statically loaded sag point, the suspension if prevented from utilizing negative travel to allow the wheel to follow drops in the terrain and thus maintain traction.

Further, due to the interaction between the linkage members of the suspension system, the suspension system once tuned to provide the described S-shaped rear wheel travel path, produces a shock rate with detrimentally high rates of change. Finally, due to the length requirements of the lower linkage member, it is impractical to utilize a small eccentric as a linkage member and benefit from the significant weight saving advantages that go along with a small eccentric linkage member.

As an example of yet another different attempt to eliminate the above common problems with bike suspensions, U.S. Pat. No. 6,099,010 to Busby discloses a bicycle having an independent equilibrium sensing suspension system for its crank assembly. This system is essentially a four bar system in which the pedal crank arm is connected to the first linkage member instead of to the front triangle. This system allows for greater rearward motion of the rear wheel without a corresponding increase in chainstay lengthening. This is accomplished by the rearward motion of the entire pedal crank assembly when the suspension is compressed. However, this motion of the pedal crank axis relative to the seat of the bicycle is perceptible to the rider, and also affects pedaling performance as the relationship between the seat and the pedals changes as the suspension is compressed.

Thus, all of the prior art suffers from a serious performance drawback: when the suspension system is configured in such a manner that the overall chainstay lengthening effect is small enough to prevent unwanted feedback to the rider's pedaling motion when the suspension system is fully compressed, the system does not offer enough chainstay lengthening effect when the suspension system is in its statically loaded sag state. None of the linkage systems currently in use or previously described drastically alter the rear wheel path to quickly move from a high rate of chainstay lengthening in the early portion of the rear wheel's motion and to the statically loaded sag point to a rate of very low chainstay lengthening after a specified point in the rear wheel's travel in close proximity to the sag point.

It is therefore a primary object of the invention to provide a suspension system offering minimal overall chainstay lengthening during full suspension compression while simultaneously offering an appropriately high level of chainstay lengthening effect when the suspension system is statically loaded.

It is a further object of the invention to provide a short link suspension system that uses a link shorter than that in conventional four bar suspension systems.

It is a further object of the invention to provide a short link suspension system comprising a link that changes its direction of rotation as the system is compressed, and more specifically comprising a short link that rotates in a first direction and then in the opposite direction as the suspension system is compressed.

It is a further object of the invention to advantageously alter the rate of chainstay lengthening in the preferential manner disclosed herein.

It is a further object of the invention to provide an optimized rear wheel travel path that allows for better pedaling performance throughout the range of suspension travel.

It is a further object of the invention to provide an optimized shock rate that advantageously provides for small changes in rate.

It is a further object of the invention to provide an optimized shock rate that advantageously changes sign more than once and articulates the rear wheel in a controlled and preferential non-arc travel path.

SUMMARY OF THE INVENTION

The present invention is a bicycle suspension system comprising a bicycle main frame and rear wheel triangle. The main frame preferably comprises a head tube for a steering apparatus, a seat tube, a down tube, a top tube, and a bottom bracket for a pedal/drive apparatus, a connection to a front end of a shock absorber, a connection to a first linkage member, and a connection to a second linkage member. The rear wheel triangle further comprises a pair of seat stays with a first end connecting to a rear drop-out and a second end connecting to seat stay ends, a pair of chainstays with a first end connecting to a rear drop-out and a second end connecting to a chainstay yoke, a pair of rear drop-outs to hold the rear wheel, a chainstay yoke providing a mechanical connection to the first linkage member, and seat stay ends providing a mechanical connection to the second linkage member.

The first linkage member is preferably one of an eccentric or an off center axle, although other small links may be utilized as are known in the art. The main frame and rear wheel triangle of the bicycle allow for the attachment of conventional bicycle components such as handlebars, a seat, the drivetrain and brakes in a standard configuration. The rear wheel triangle also has attachment points to linkage members in specific locations that contribute to controlling the motion of the rear wheel axle.

The first linkage member (and, in a preferred embodiment, the lower and shorter of the links) and the second link contribute to controlling the motion of the rear wheel axle. In an exemplary embodiment, the first linkage member when viewed from the drivetrain side of the bike rotates counter-clockwise to add chainstay lengthening in the beginning of the travel of the suspension system, and then reverses rotational direction to rotate clockwise near the end of the travel of the suspension system. Alternative embodiments of the invention may have different rotation characteristics to achieve the same effect. The first linkage member's proximity to the drivetrain chain line of the bicycle allows the first linkage member's small length to have a significant effect on chainstay lengthening. The second linkage member, in addition to contributing to controlling the rear axle motion, in a preferred embodiment also allows for the attachment of the shock absorber, and its configuration controls the ratio of the shock absorber compression relative to the rear wheel compression.

DESCRIPTION OF THE FIGURES

The foregoing aspects and many of the advantages of the invention will become more readily appreciated as the same becomes better understood by reference to the following detailed description, when taken in conjunction with the accompanying drawings, wherein.

DETAILED DESCRIPTION OF THE INVENTION

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

Many bicycles (bikes) have a rear suspension system that guides the rear wheel of the bike to move along a preferred rear wheel axle path. As the suspension guides the rear wheel in this way, there is an associated change in the chainstay length (CSL), that is, in the distance from the pedal axis (single axis generally near the middle of the bike about which rotate both pedals) to the rear wheel axis. This change, with respect to vertical wheel travel, is referred to as chainstay lengthening ("dCSL") and may be either positive or negative depending if the distance (CSL) is being increased or decreased as the rear wheel axle moves vertically. The rate of change of chainstay lengthening with respect to vertical wheel travel is $d^2CSL$. Even slight modifications to CSL, dCSL, and $d^2CSL$ can have a dramatic effect on bike performance and rider comfort. In a preferred embodiment of the present invention, the Applicant's suspension system has a high dCSL in the beginning portion of the suspension's travel, and then a rapid decrease in dCSL in a later portion of the suspension's travel. Thus, relative to previous systems the overall chainstay length increase is relatively small, yet many performance and comfort benefits are still derived.

Figure 1:
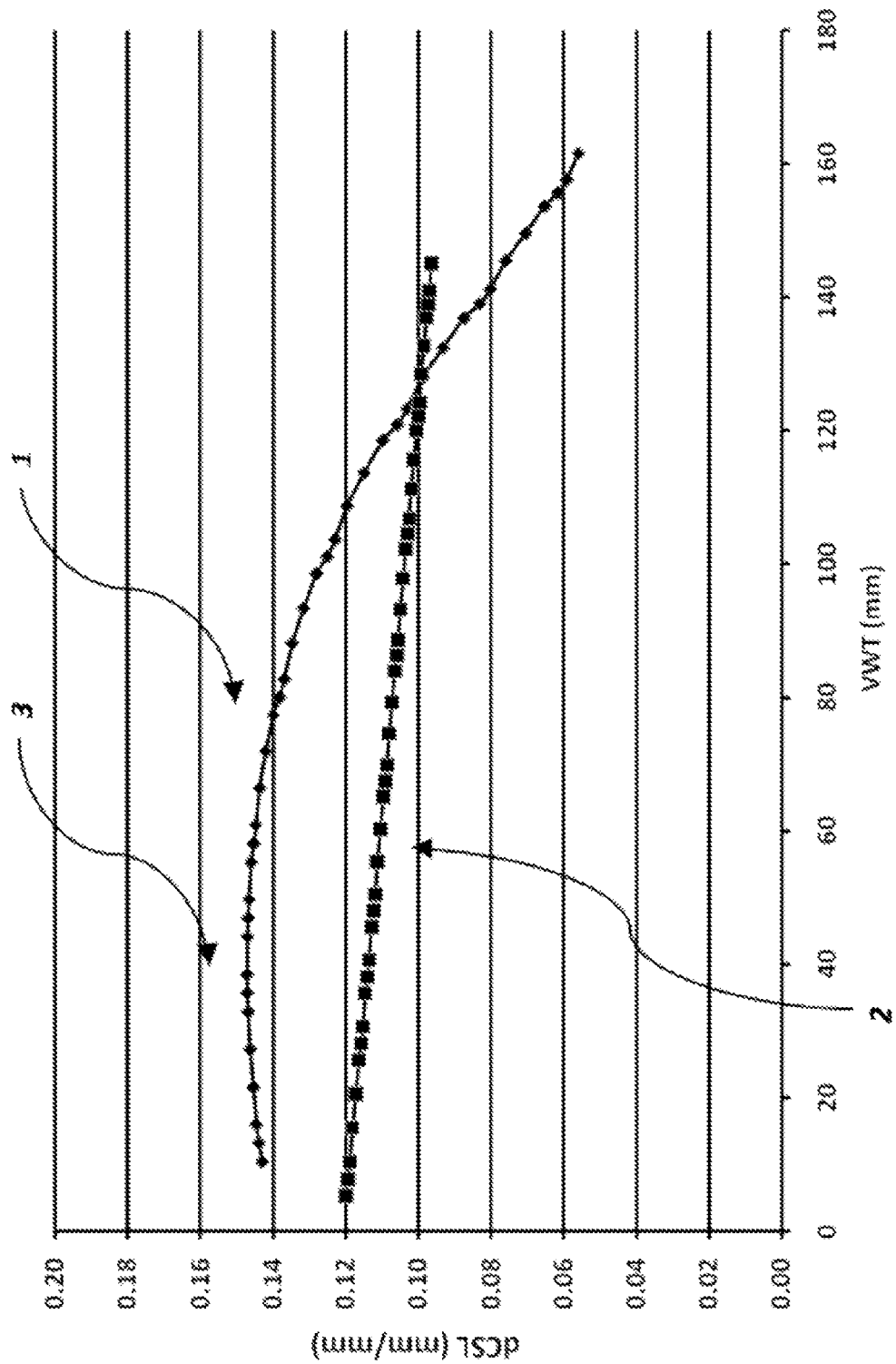
FIG. 1 is a graph showing chainstay lengthening (i.e. the derivative of chainstay length with respect to vertical wheel travel ("dCSL")) vs. vertical wheel travel ("VWT") for both a preferred embodiment of the present invention (curved line) and for a prior art single pivot suspension system (straight line) in which the main pivot location for both systems is identical.
Figure 2:
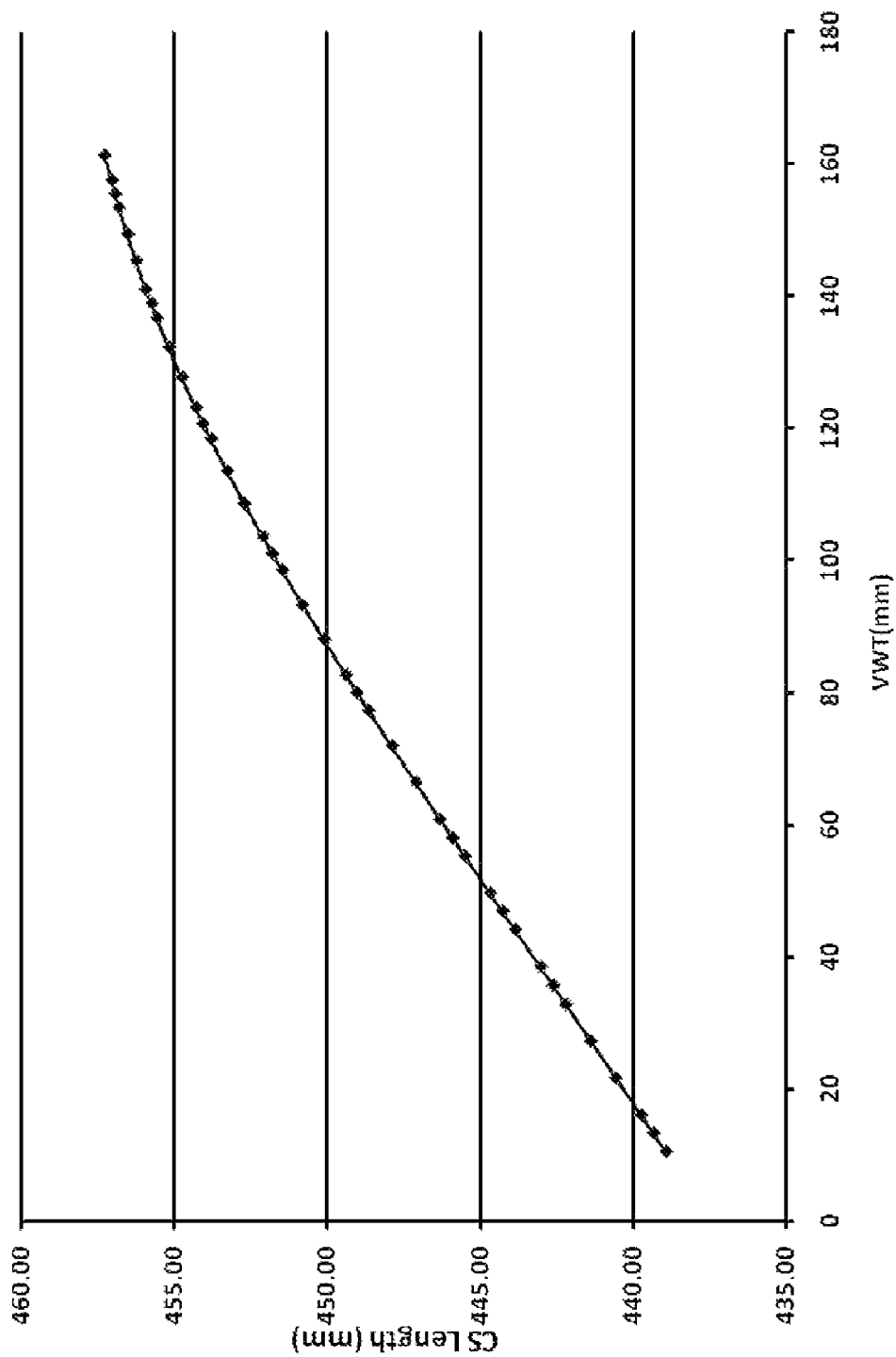
FIG. 2 is a graph showing chainstay length with respect to vertical wheel travel for a preferred embodiment of the present invention.

FIG. 1 depicts a plot of the derivative of the chainstay length (dCSL) (i.e. the rate of change of chainstay lengthening) with respect to vertical wheel travel ("VWT") vs. vertical wheel travel. (FIG. 2, simpler, just depicts CSL vs. VWT). Curved plotline 1 is representative data of the preferred embodiment of the present invention. As should be readily apparent, the rate is much higher at the beginning stages of the suspension compression, where VWT is relatively small. As VWT increases, the dCSL decreases. For comparison, straight plot line 2 is data for the same vertical wheel travel distances measured in a representative single pivot suspension system with the main pivot located in the same position relative to the bottom bracket and drivetrain path as in the preferred embodiment of the present invention. A first point 3 exists where the second derivative of CSL (i.e. the rate of change of chainstay lengthening) with respect to vertical wheel travel is equal to the constant value of the second derivative of the chainstay length of a representative single pivot suspension system with the main pivot location at the same location of the present invention.

The varying rate of CSL described above is accomplished through a linkage system comprising a very small link located in close proximity to the bicycle's chain drive force line.

Figure 3:
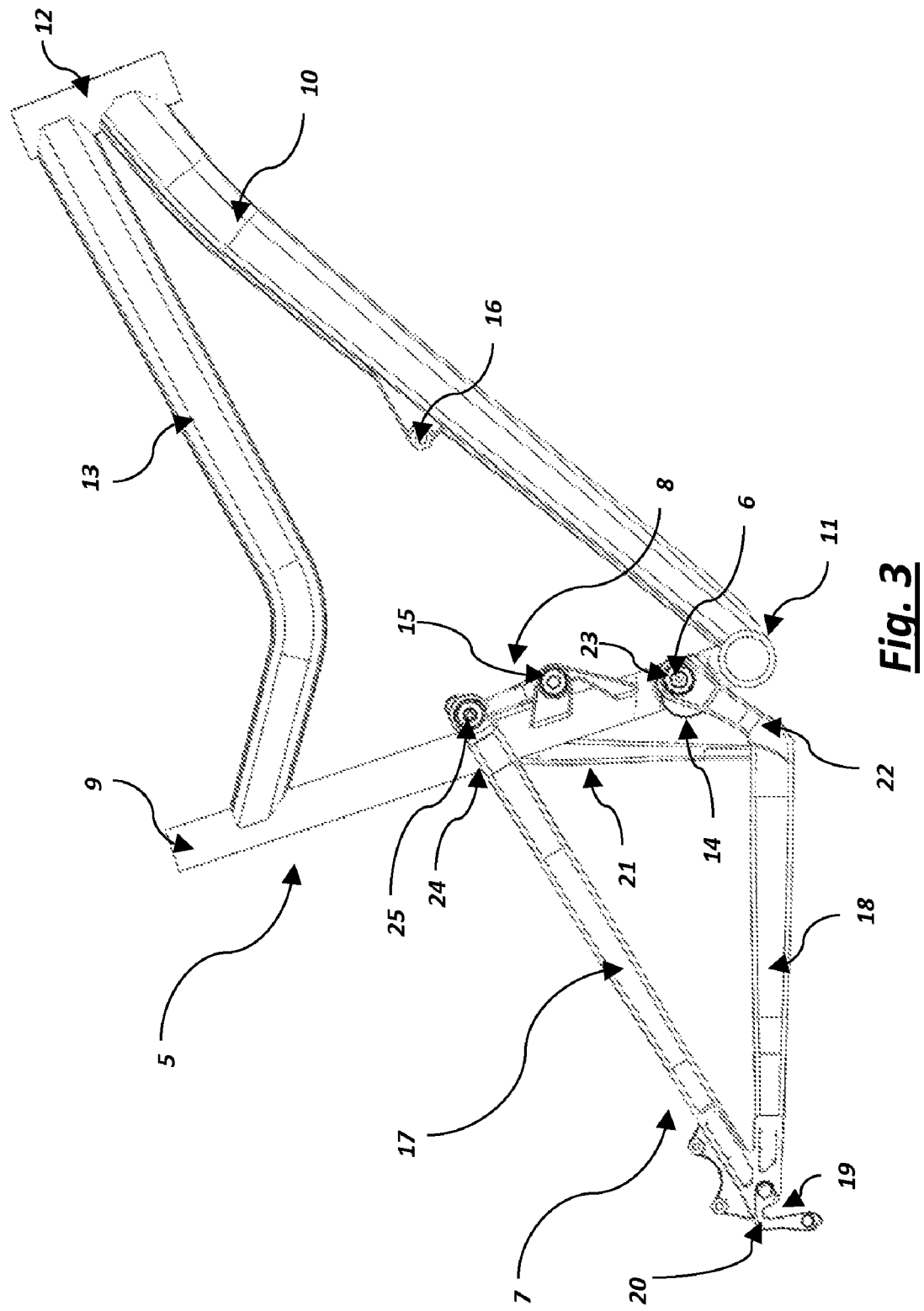
FIG. 3 depicts a right side view of the present invention to illustrate the components of the system in a preferred embodiment.

Referring first to FIG. 3, a right side view of the preferred embodiment of the present invention is depicted. The system comprises a rear wheel swingarm 7 connected to a main front triangle 5, by the means of a first linkage member 6, and a second linkage member 8.

The front triangle 5 further comprises a seat tube 9, and a down tube 10, both of which are attached to a bottom bracket 11 that houses a pedal assembly (not shown), and a head tube 12, which serves as a steering axis for a front wheel (not shown) and to which is attached a top tube 13. There is a first linkage pivotal connection 14 above the bottom bracket 11 that creates a pivotal connection between front triangle 5 and first linkage member 6. There is a second linkage pivotal connection 15 above the first linkage pivotal connection 14 for a pivotal connection between front triangle 5 and the second linkage member 8. Additionally, down tube 10 comprises a connection for a front triangle forward shock mount 16 for a shock absorber (not shown in this figure, see FIG. 6). These elements are in the preferred embodiment welded or otherwise tightly secured together to define the main frame of the bicycle.

Figure 6:
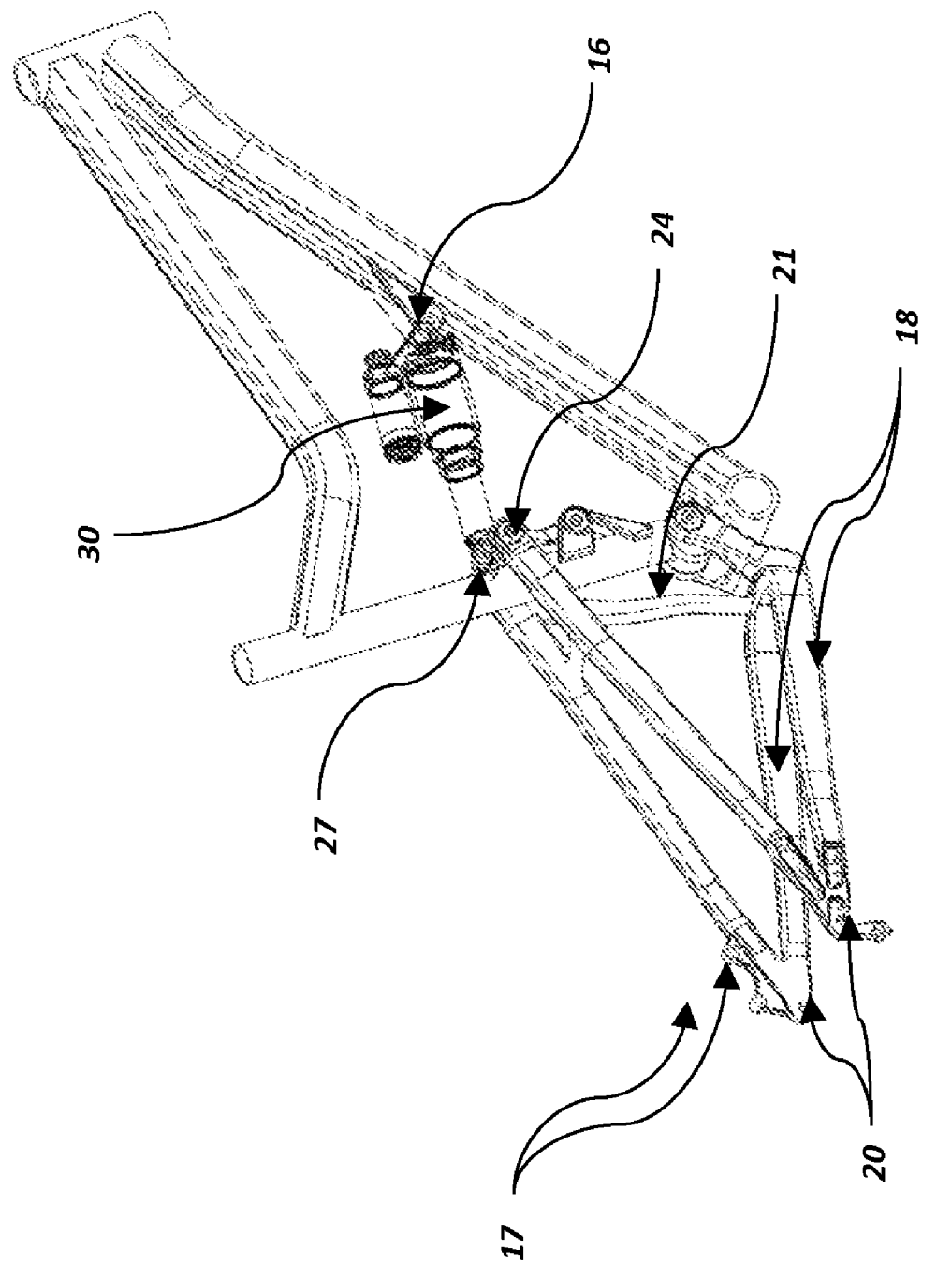
FIG. 6 depicts a perspective view of the preferred embodiment.

Further referencing FIG. 3, the rear wheel swingarm 7, as further depicted in FIG. 6 for clarity, includes a pair of seat stays 17 and a pair of chainstays 18 that are joined to each other creating an acute angle at their rearward ends proximate a rear wheel axle 19 (rear wheel not shown) at a pair of rear wheel dropouts 20. A single upright structure 21 is engaged between the pair of chainstays 18 and the pair of seat stays 17 to provide a rigid triangular structure for swingarm 7. See FIGS. 3 and 6. A chainstay yoke 22 is joined to the forward end of chainstays 18, and houses a chainstay pivotal connection 23 to the first linkage member 6. A pair of seat stay ends 24 is joined to the forward end of seat stays 17 and house a seat stay pivotal connection 25 to the second linkage member 8. In an exemplary embodiment of the invention, the distance between the chainstay pivotal connection 23 and rear wheel axle 19 is approximately 442 mm, but this distance can be accomplished by various combinations of lengths of rear drop-out 20, chainstays 18, and chainstay yoke 22. The distance between the seat stay pivotal connection 25 and the rear wheel axle 19 in the exemplary embodiment is approximately 463 mm.

The distance between chainstay pivotal connection 23 and seat stay pivotal connection 25 in the exemplary embodiment is approximately 169 mm. In the preferred embodiment, bearings are utilized to provide the means of pivotal connection, however, it should be clear to one skilled in the art that a pivotal connection other than bearings, such as a bushing or other structure, could be utilized for either pivotal connection, and that lengths of various members could be adjusted to accommodate various configurations without changing the scope of the present invention.

Figure 4:
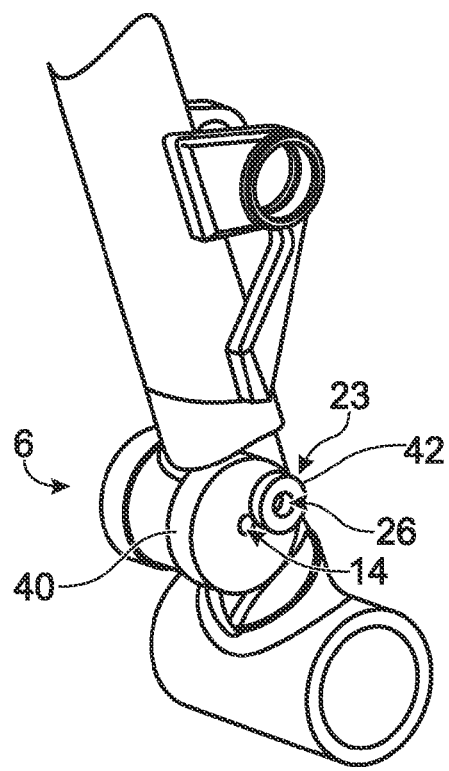
FIG. 4 depicts a detailed perspective view of the first link and surrounding components of preferred embodiment.

Referring now to FIG. 4, which illustrates a detailed view of first linkage member 6, first linkage pivotal connection 14, and chainstay pivotal connection 23. The first linkage member 6 in the preferred embodiment is an eccentric mechanism in which first linkage pivotal connection 14 is achieved by a bearing assembly 40 that in the exemplary embodiment is approximately 35 mm in inner diameter. Other structures which accomplish the same eccentric pivoting action, such as an off center axle or the like may be used without departing from the scope of the invention. Chainstay pivotal connection 23 utilizes a smaller cartridge bearing assembly 42 housed within the chainstay yoke 22 (not shown in FIG. 4) of rear triangle 7 and an axle 26 that is in the preferred embodiment is bolted through a shaft and offset within the first linkage member 6 a distance in the exemplary embodiment of approximately 11.5 mm from the center of first linkage pivotal connection 14. The first linkage pivotal connection 14 is approximately 49 mm above the pedal axis of the bottom bracket 11 and 29 mm behind the pedal axis of said bottom bracket 11. It should be clear to one skilled in the art that a pivotal connection other than a bearing assembly could be utilized for the first linkage pivotal connection 14 and the chainstay pivotal connection 23. Further, the chainstay pivotal connection 23 may be contained within either the first linkage member 6 or the rear wheel swingarm 7, and the distance between the first linkage pivotal connection 14 and the chainstay pivotal connection 23 as well as the location of first linkage pivotal connection 14 relative to the bottom bracket 11 may be adjusted to accommodate various configurations without changing the scope of the present invention.

Figure 5:
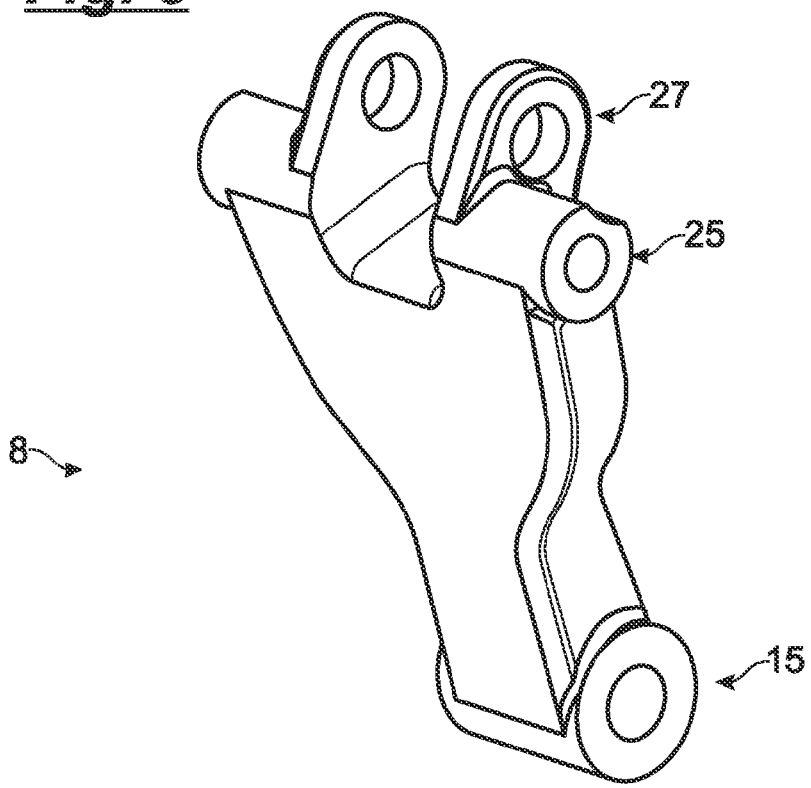
FIG. 5 depicts a detailed perspective view of the second link of the preferred embodiment.

Referring now to FIG. 5 which illustrates a detailed view of second linkage member 8, second linkage pivotal connection 15 at one end, and seat stay pivotal connection 25 at the other end, the distance between the two pivotal connections in the exemplary embodiment is approximately 71.5 mm. The second linkage member 8 further comprises a shock absorber pivotal connection 27 to which a shock absorber (not shown in FIG. 5) may be attached. In the exemplary embodiment of the invention, the shock absorber pivotal connection 27 is approximately 15 mm from the seat stay pivotal connection 25 and 80.5 mm from the second linkage pivotal connection 15. In this exemplary embodiment, second linkage pivotal connection 15 is located approximately 154 mm above the bottom bracket pedal axis 11 and 17 mm behind the bottom bracket pedal axis 11.

FIG. 6 is a perspective view of the preferred embodiment of the invention that illustrates a representative shock absorber 30 pivotally engaged between a front triangle forward shock mount 16 and the shock absorber pivotal connection 27. As the rear wheel is articulated generally upwards, the shock absorber is compressed in length between the two mounting points providing resistance to the rear wheel's motion.

Figure 7:
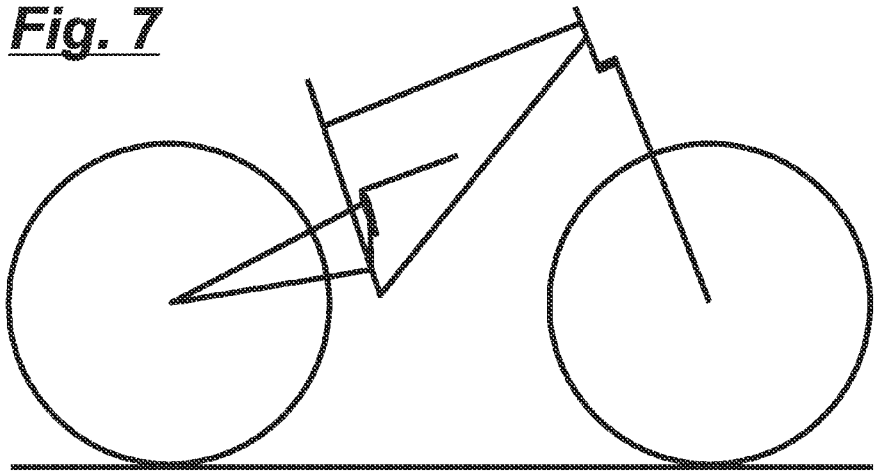
FIG. 7 is a simplified schematic of the preferred embodiment of the present invention wherein the suspension is fully extended.
Figure 8:
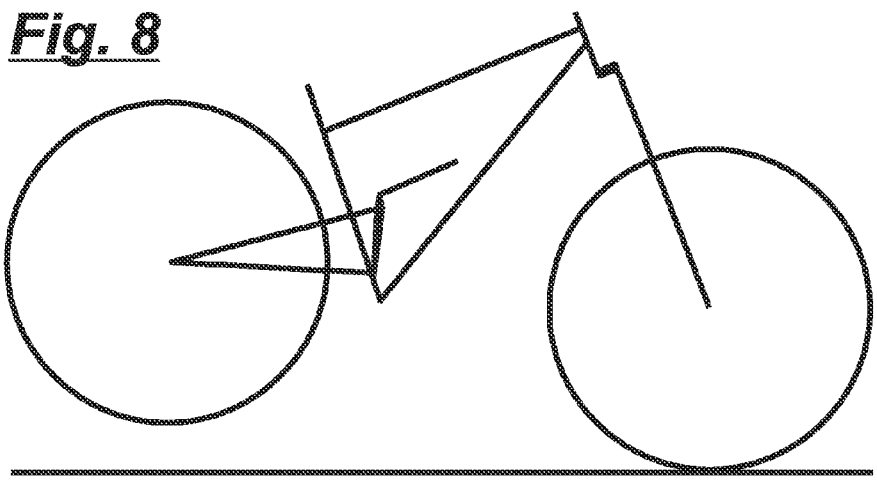
FIG. 8 is a simplified schematic of the preferred embodiment the present invention wherein the suspension in a state midway between full extension and full compression.
Figure 9:
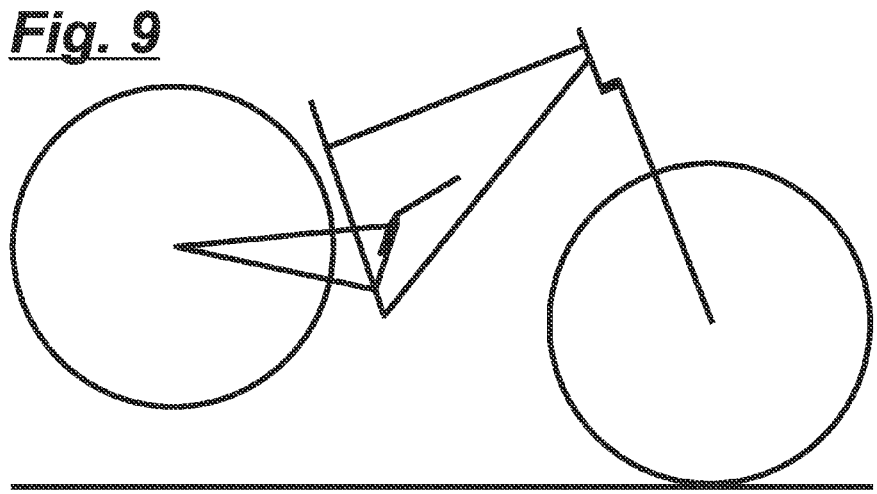
FIG. 9 is a simplified schematic of the preferred embodiment the present invention wherein the suspension is fully compressed.

FIGS. 7-9 depict schematics of the preferred embodiment of the invention wherein the rear wheel suspension is at varying stages of compression. FIG. 7 shows the suspension system in its fully extended (uncompressed) state while FIG. 9 shows the suspension system in its fully compressed state. FIG. 8 shows the suspension system in a state between full extension and full compression.

Figure 10:
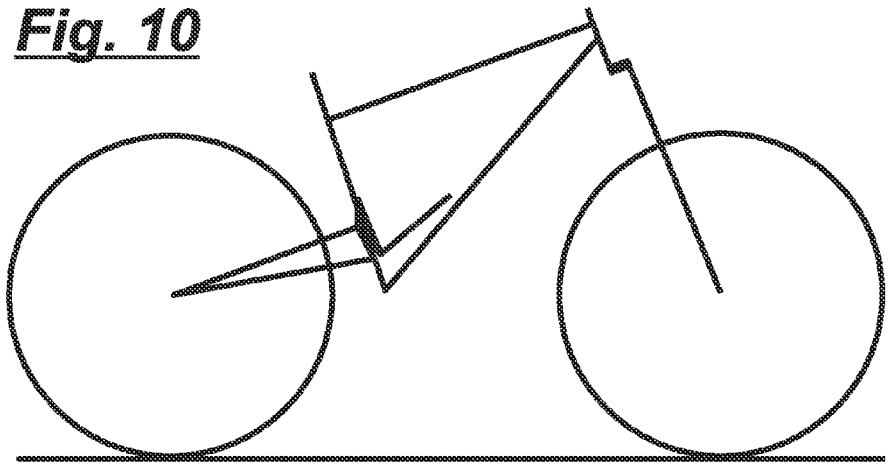
FIG. 10 is a simplified schematic of an alternative embodiment of a rear wheel suspension system of a bicycle according to the present invention wherein the suspension is fully extended.
Figure 11:
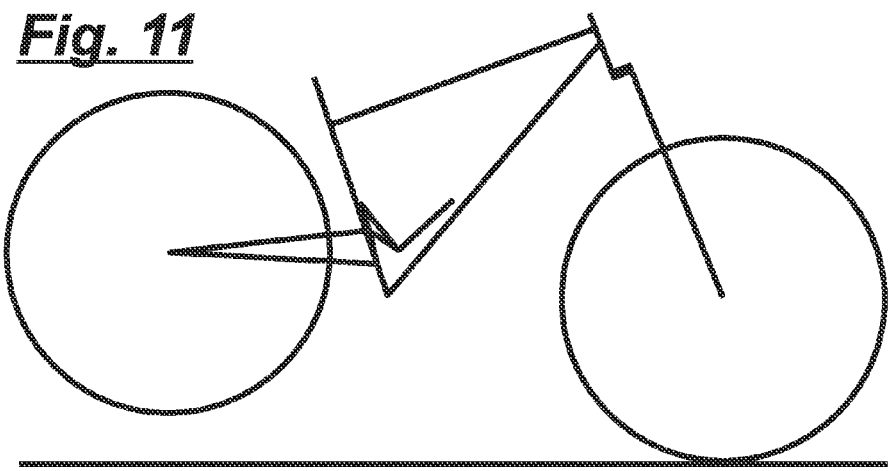
FIG. 11 is a simplified schematic of the alternative embodiment wherein the suspension is in a state midway between full extension and full compression.
Figure 12:
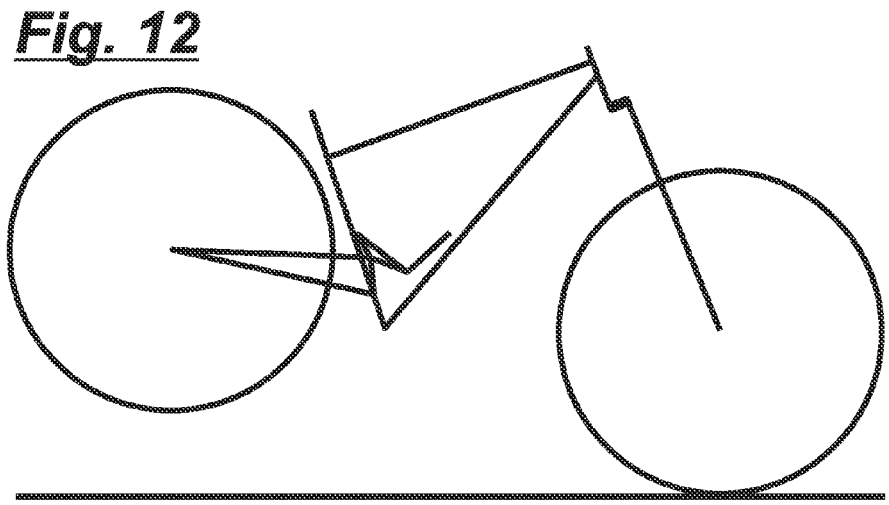
FIG. 12 is a simplified schematic of the alternative embodiment wherein the suspension is fully compressed.

FIGS. 10-12 depict schematics of a variation of the preferred embodiment where the connection between the second linkage member and the main frame is above the connection between the second linkage member and the rear triangle at varying stages of compression of the rear wheel suspension system. FIG. 10 shows the suspension system in its fully extended (uncompressed) state while FIG. 12 shows the suspension system in its fully compressed state. FIG. 11 shows the suspension system in a state between full extension and full compression.

Referring once again to FIG. 10 the variation of the preferred embodiment's pivotal connection between the second linkage member and the main frame is differentiated from the previously described preferred embodiment as being located above the pivotal connection between the second linkage member and the rear triangle. Here, the bicycle main frame generally includes a seat tube and a down tube, both of which are attached to a bottom bracket that houses a pedal assembly, a top tube, together with the down tube attached to the head tube, and a front fork. There is a first location above the bottom bracket pedal axis and proximate to the bicycle chain drive force line for the pivotal connection to the first linkage member of the rear wheel suspension system, and a second location above the first location for the pivotal connection to the second linkage member. Additionally, there is a connection on the down tube for the forward connection of the shock absorber. These elements are typically welded or otherwise secured together to define the main frame of the bicycle.

Continuing with FIG. 10, the rear wheel suspension system generally includes a first linkage member, a rear wheel swingarm, and a second linkage member. The first linkage member of the variation of the preferred embodiment is an eccentric mechanism in which a bearing assembly of approximately 35 mm in inner diameter accomplishes the pivotal connection between the first linkage member and the rear triangle. The pivotal connection between the first linkage member and the rear triangle utilizes a smaller bearing assembly housed within the chainstay yoke of the rear triangle, and a axle that is bolted through a shaft offset within the first linkage member a distance of approximately 13 mm from the center of the main pivotal connection between the first linkage member and the main frame. The main pivot location between the first linkage member and the main frame is approximately 66 mm above the pedal axis of the bottom bracket and 27 mm behind the bottom bracket. Although bearing assemblies are described and are the preferred means for creating the pivotal connections, other means well known in the art could be used. In addition, the pivotal connection to the rear triangle may be contained within either the first linkage member or the rear triangle, and the distance between the pivotal connections of the first linkage member as well as the first linkage pivotal connection location relative to the bottom bracket could be adjusted to accommodate various configurations without changing the scope of the present invention.

Further referencing the schematic shown in FIG. 10, the rear wheel swingarm includes a pair of seat stays and a pair of chainstays that are joined to each other at their rearward ends proximate to the axle of the rear wheel at a pair of rear wheel drop-outs. An upright structure is engaged between the chainstays and the seat stays to provide a rigid triangular structure for the swingarm. A chainstay yoke is joined to the forward end of the chainstays and houses a pivotal connection to the first linkage member. Seat stay ends are joined to the forward end of the seat stays and house a pivotal connection to the second linkage member. The distance between the chainstay pivot and the rear axle of the alternative embodiment is approximately 419 mm, and said length can be accomplished by various combinations of lengths of rear drop-out, chainstays, and chainstay yoke. The distance from the seat stay pivotal connection between the rear triangle and the second linkage member of the preferred embodiment to the rear wheel axle is approximately 420 mm. The distance from the pivotal connection between the rear triangle and the first linkage member to the pivotal connection between the rear triangle and second linkage members of the preferred embodiment is approximately 80 mm.

The second linkage member has a pivotal connection to the rear triangle at one end, and a pivotal connection to the main frame on the other end. The distance between the seat stay pivotal connection and the second linkage pivotal connection in the exemplary embodiment of the alternative embodiment of the invention is approximately 53 mm. The pivotal connection between the second linkage member and the main frame of the bicycle is located approximately 12 mm above the bottom bracket and 37 mm behind the bottom bracket.

The second linkage member additionally contains a pivotal connection to provide for the attachment of a bicycle shock absorber. This pivotal connection is approximately 36 mm from the seat stay pivotal connection between the second linkage member and the rear triangle and 45 mm from the second linkage pivotal connection between the second linkage member and the front triangle.

Figure 13:
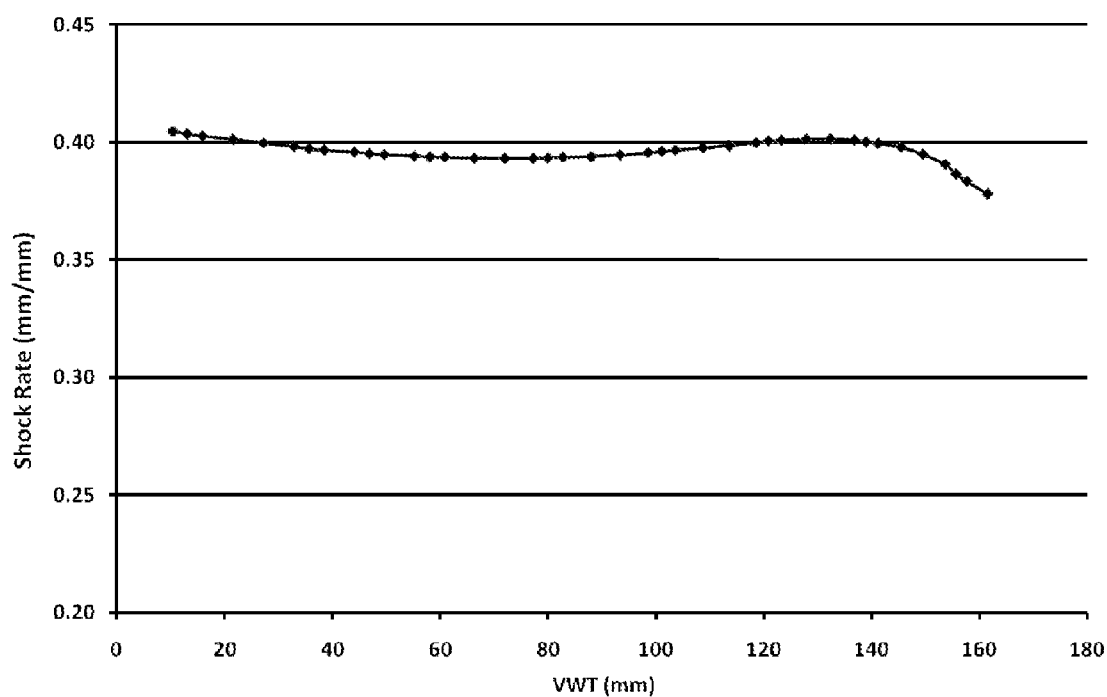
FIG. 13 is a graph showing shock rate with respect to VWT for a preferred embodiment of the present invention.
Figure 14:
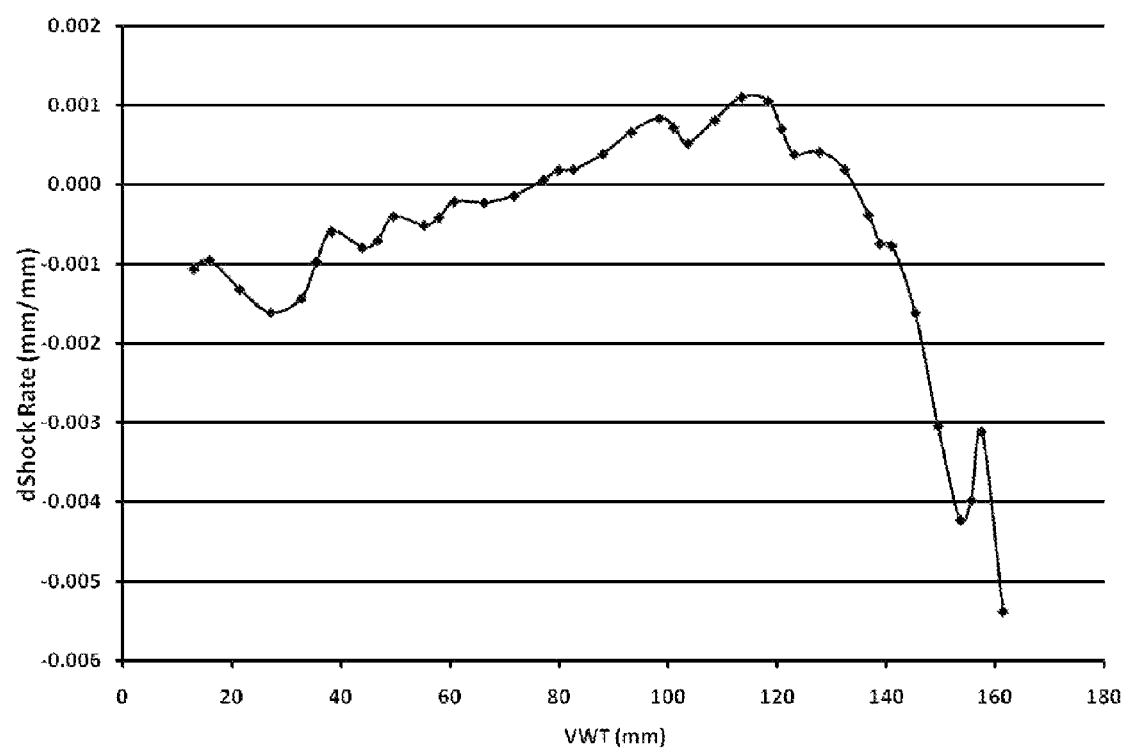
FIG. 14 is a graph showing the rate of change of shock rate with respect to VWT.

A shock absorber is pivotally engaged between the forward shock mount of the main frame and the rearward shock mount of the second linkage member. As the rear wheel is articulated generally upwards along its axle path, the shock absorber is compressed in length between the two mounting points providing resistance to the rear wheel's motion. FIG. 13 depicts a plot of shock rate vs. vertical wheel travel. This figure illustrates the relatively small overall change in shock rate in the Applicant's system, and specifically that the slope of the curve is first negative, then positive, then negative again. FIG. 14 depicts a plot of the derivative of shock rate with respect to vertical wheel travel ('d Shock Rate') vs. vertical wheel travel. This figure further illustrates the change in shock rate by confirming that at the points where the shock rate is inflected from a negative slope to a positive slope and from a positive slope to a negative slope the derivative of the shock rate is zero. It should be apparent from this figure that the derivative shock rate curve is zero at two points indicating a change in sign of the shock rate.

FIG. 15-19 depict a simplified schematic of the first linkage member, including a first pivotal connection 29 to the main front triangle and a second pivotal connection 30 to the rear wheel swingarm forward of the first pivotal connection, a rear wheel axle 28, and a vertical plane relative to the ground (not labeled with a reference number) when the suspension system is fully extended and additionally some distance 31 behind the first linkage member. These figures illustrate the motion of the second pivotal connection 30 of the first linkage member relative to the vertical plane as the suspension system is compressed.

Figure 15:
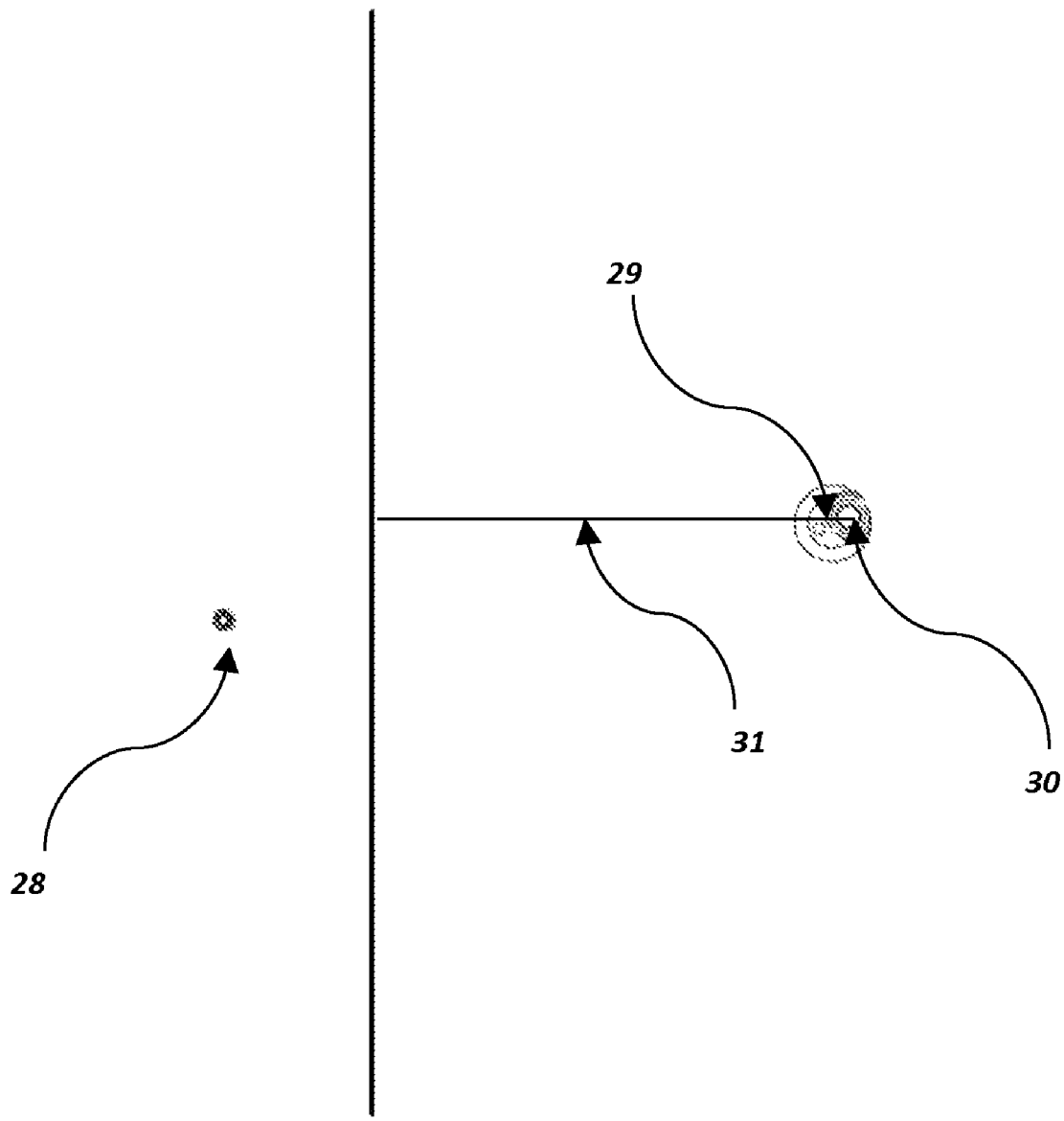
FIG. 15 is a diagrammatic example showing an imaginary plane located a distance behind second pivotal connection and perpendicular with respect to the ground, wherein the suspension is in a first, or fully extended configuration.
Figure 16:
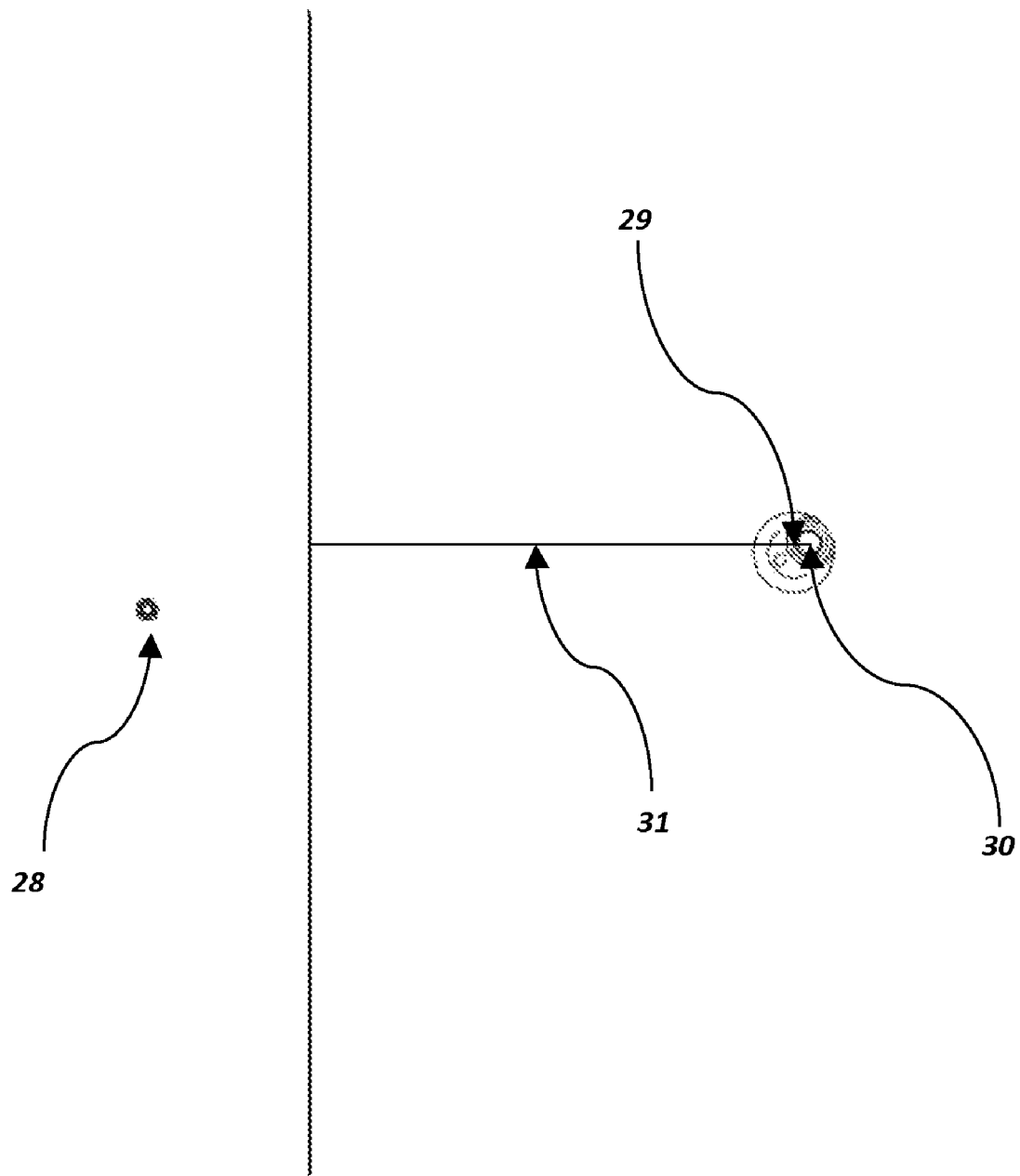
FIG. 16 is a diagrammatic example showing said imaginary plane wherein the suspension is in a second configuration.
Figure 17:
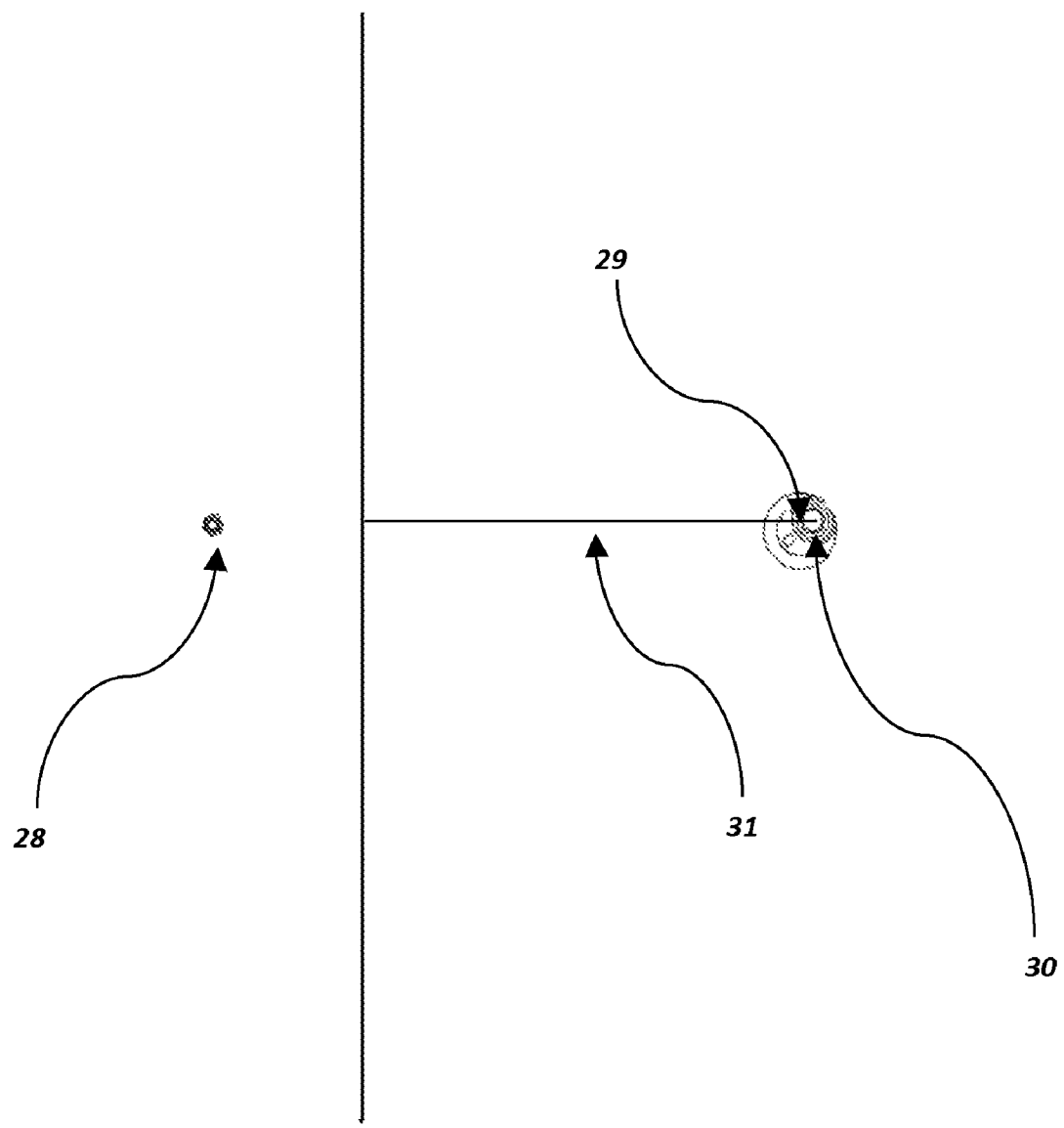
FIG. 17 is a diagrammatic example showing said imaginary plane wherein the suspension is in a third configuration.
Figure 18:
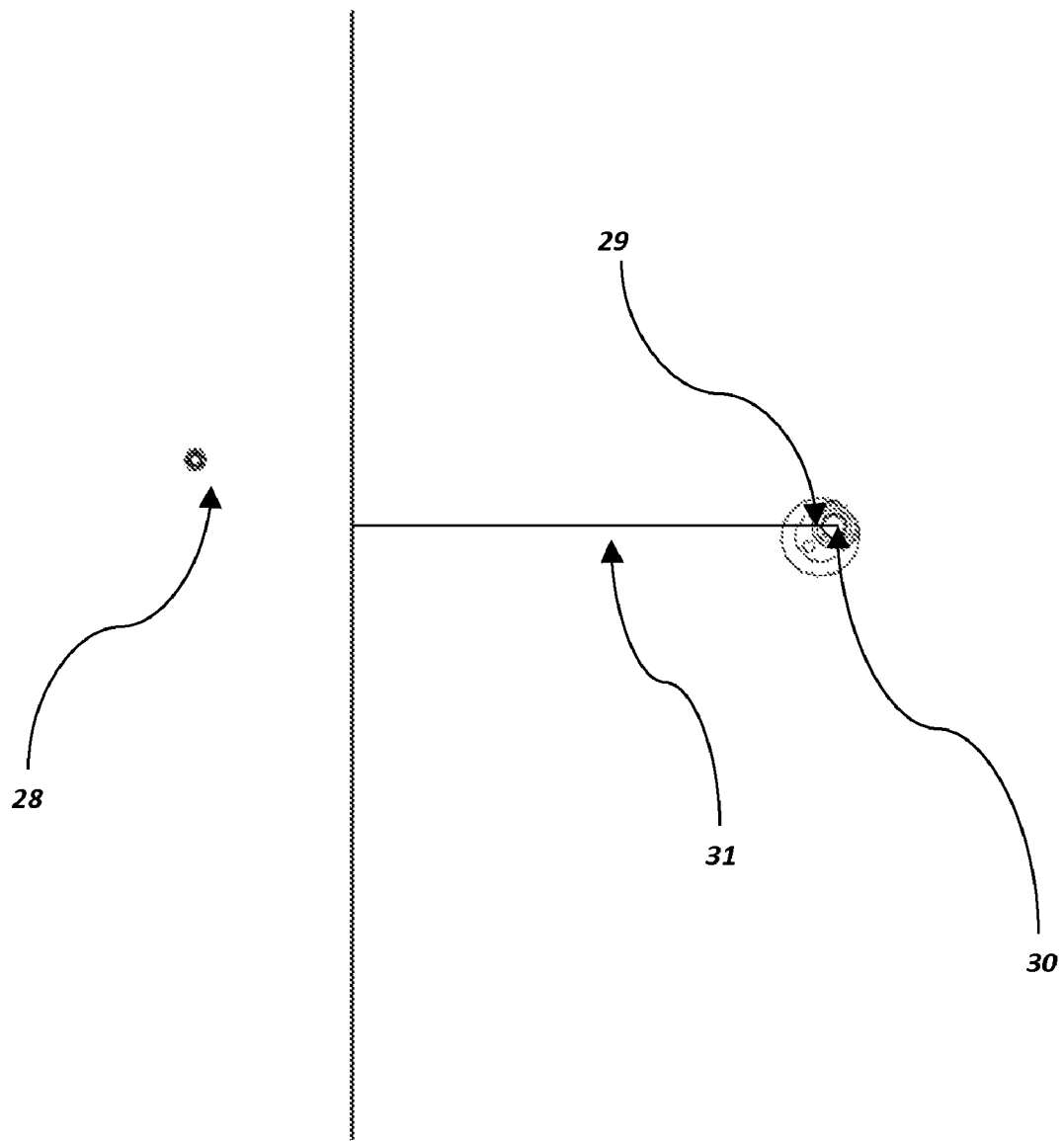
FIG. 18 is a diagrammatic example showing said imaginary plane wherein the suspension is in a fourth configuration.
Figure 19:
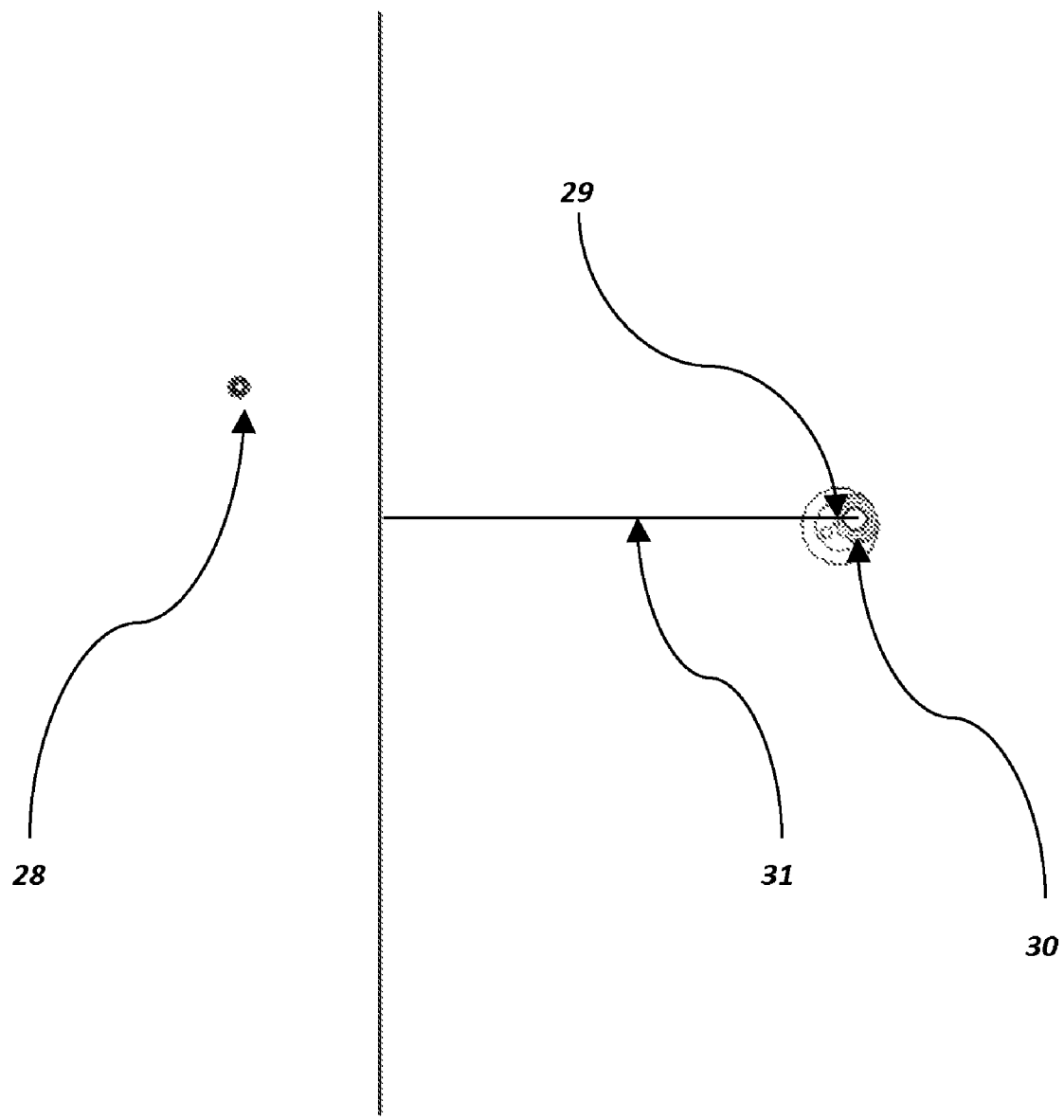
FIG. 19 is a diagrammatic example showing said imaginary plane wherein the suspension is in a fifth, or fully compressed configuration.

Moving through the Figures, FIG. 15 depicts the system in its fully extended state. FIG. 16-18 show the system in increasing states of compression, and FIG. 19 shows the system in its fully compressed state. As the rear wheel axle 28 moves in a generally upward motion due to suspension compression, the second pivotal connection 30 of the first linkage member first moves closer to the vertical plane 32 and then moves away from the vertical plane.

As an additional means to describe the suspension system disclosed herein, and continuing to refer to FIGS. 15-19, the bike and suspension may be said to comprise a front triangle and rear wheel having a rear wheel axis, and a rear wheel suspension system. The rear wheel suspension system comprises a linkage member further comprising a first pivotal axis for connection to the front triangle and a second pivotal axis for connection to a rear wheel swingarm. In this brief description of the system, the distance from the second pivotal axis to some arbitrary vertical plane can be said to decrease during a first portion of the suspension compression and increase from the arbitrary vertical plane during the second portion of suspension compression, wherein as the suspension changes configuration from fully extended to fully compressed, it moves through, in order, the first portion and second portion of compression. The arbitrary vertical plane in this description is defined as some plane perpendicular to the ground when the suspension is fully extended, and located a distance behind said second pivotal connection. Because the vertical plane's location is only for reference to show changes in distance as the suspension compressions, the initial distance between the vertical plane and second pivotal connection is inconsequential.

In addition to the above-described members of the preferred and alternative embodiment, additional conventional elements such as those used to secure cables, brakes, drivetrain components and the like to the frame and keep them from interfering with the movement and operation of the bicycle may also be attached at various locations. Persons of ordinary skill in the art will appreciate that the exact configuration, size of, and relationship between the frame members can vary depending on, among other things, the size of the bicycle frame, the amount of vertical wheel travel, and the size of the rear wheel.

With respect to the above description then, it is to be realized that material disclosed in the Applicants' drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention. Therefore, the foregoing is considered as illustrative only of the principles of the invention.

We claim:
1. A rear suspension bicycle, comprising:
   a front triangle;
   a rear wheel swingarm;
   a first linkage member having a first pivotal connection with the front triangle and a second pivotal connection with the rear wheel swingarm;
   a second linkage member having a first pivotal connection with the front triangle and a second pivotal connection with the rear wheel swingarm; and
   a shock absorber operatively connected to the front triangle and the rear wheel swingarm and configured to control movement of the rear wheel swingarm relative to the front triangle;
   wherein as the shock absorber is compressed from a fully uncompressed state toward a fully compressed state, the pivotal connection of the first linkage member with the rear wheel swingarm initially rotates in a first direction of rotation relative to the pivotal connection of the first linkage member with the front triangle, and subsequently rotates in a second direction of rotation relative to the pivotal connection of the first linkage member with the front triangle.

2. The bicycle of claim 1, wherein the first direction of rotation is toward a vertical plane disposed between the rear wheel dropouts and the first linkage member, and the second direction of rotation is away from the vertical plane.

3. The bicycle of claim 1, wherein the first pivotal connection of the first linkage member and the second pivotal connection of the first linkage member are separated by a distance of less than 25 mm.

4. The bicycle of claim 1, wherein the first pivotal connection of the first linkage member and the second pivotal connection of the first linkage member are separated by a distance of less than 15 mm.

5. The bicycle of claim 1, wherein the first pivotal connection of the first linkage member and the second pivotal connection of the first linkage member are separated by a distance of approximately 11.5 mm.

6. The bicycle of claim 1, wherein the first linkage member is an eccentric linkage member.

7. A bicycle rear suspension system, comprising:
   a first linkage member configured to make a pivotal connection with a bicycle front triangle and also to make a pivotal connection with a bicycle rear wheel swingarm;
   a second linkage member configured to make a pivotal connection with the front triangle and also to make a pivotal connection with the rear wheel swingarm; and
   a shock absorber operatively connected to the front triangle and the rear wheel swingarm and configured to control movement of the rear wheel swingarm relative to the front triangle;
   wherein as the shock absorber is compressed from a fully uncompressed state toward a fully compressed state, (i) rotation of the linkage members about the pivotal connections causes a rate of change of chainstay length as a function of vertical wheel travel initially to increase at least until the suspension system reaches its statically loaded sag point and subsequently to decrease, and (ii) the first linkage member changes its direction of rotation.

8. The suspension system of claim 7, wherein the pivotal connection of the first linkage member with the front triangle and the pivotal connection of the first linkage member with the rear swingarm are separated by a distance of less than 25 mm.

9. The suspension system of claim 7, wherein the pivotal connection of the first linkage member with the front triangle and the pivotal connection of the first linkage member with the rear swingarm are separated by a distance of less than 15 mm.

10. The suspension system of claim 7, wherein the pivotal connection of the first linkage member with the front triangle and the pivotal connection of the first linkage member with the rear swingarm are separated by a distance of approximately 11.5 mm.

11. The suspension system of claim 7, wherein the first linkage member is an eccentric linkage member.

12. A rear suspension bicycle frame, comprising:
   a front frame portion;
   a rear frame portion configured to receive a rear wheel and joined to the front frame portion by a pair of linkage members;
   a shock absorber operatively connected to the front frame portion and the rear frame portion;
   wherein as the shock absorber is compressed from a fully uncompressed state toward a fully compressed state, rotation of the linkage members causes (i) a shock rate of the bicycle frame initially to decrease, subsequently to increase, and then again to decrease, and (ii) movement of the rear wheel in a non-arc travel path relative to the front frame portion.

13. The suspension system of claim 12, wherein the first pivotal connection and the second pivotal connection are separated by a distance of less than 25 mm.

14. The suspension system of claim 12, wherein the first pivotal connection and the second pivotal connection are separated by a distance of less than 15 mm.

15. The suspension system of claim 12, wherein the first pivotal connection and the second pivotal connection are separated by a distance of approximately 11.5 mm.

16. A rear suspension bicycle, comprising:
a front wheel;
a front frame portion configured to receive the front wheel;
a rear wheel;
a rear frame portion joined to the front frame portion by a pair of linkage members and configured to receive the rear wheel; and
a shock absorber operatively connected to the front frame portion and the rear frame portion;
wherein as the shock absorber is compressed from a fully uncompressed state toward a fully compressed state, rotation of the linkage members causes a shock rate of the bicycle frame initially to decrease, subsequently to increase, and then again to decrease; and
wherein as the shock absorber is compressed from a fully uncompressed state toward a fully compressed state, rotation of the linkage members causes the rear wheel to move in a non-arc travel path relative to the front wheel.

17. A rear suspension bicycle frame, comprising:
a front frame portion;
a rear frame portion configured to receive a rear wheel and joined to the front frame portion by first and second linkage members; and
a shock absorber operatively connected to the front frame portion and the rear frame portion;
wherein the first linkage member has a length, defined by a distance between pivotal connections to the front and rear frame portions, respectively, of less than 20 millimeters; and
wherein as the shock absorber is compressed from a fully uncompressed state toward a fully compressed state, rotation of the linkage members causes the rear wheel to move in a non-arc travel path relative to the front frame portion.

18. The suspension system of claim 17, wherein the first linkage member has a length of less than 15 mm.

19. The suspension system of claim 18, wherein the first linkage member has a length of approximately 11.5 mm.

* * * * *